(No Model.)

W. VOGEL.
POCKET KNIFE.

No. 448,168.        Patented Mar. 10, 1891.

Witnesses:
Max Steinberg

Inventor
Wilhelm Vogel
per
Attorney.

UNITED STATES PATENT OFFICE.

WILHELM VOGEL, OF COLOGNE, GERMANY, ASSIGNOR TO MAX STEINBERG, OF SAME PLACE.

POCKET-KNIFE.

SPECIFICATION forming part of Letters Patent No. 448,168, dated March 10, 1891.

Application filed February 19, 1890. Serial No. 341,068. (No model.) Patented in France December 4, 1889, No. 189,264, and in England December 7, 1889, No. 19,720.

*To all whom it may concern:*

Be it known that I, WILHELM VOGEL, a subject of the King of Prussia, residing at Cologne, in the Kingdom of Prussia, have invented certain new and useful Improvements in Pocket-Knives, (for which I have obtained a patent in England, dated December 7, 1889, No. 19,720, and in France, dated December 4, 1889, No. 189,264,) of which the following is a specification.

This invention has for its object to construct a pocket-knife in such a manner that it can be completely closed and the interior protected against dirt or dust, and that the individual blades as well as the casing can be easily cleaned, while affording greater security against accidental cutting.

In the following description reference will be made to the annexed drawings, Figures 1 to 6, which represent a knife embodying my invention.

Figure 1:
Figure 2:
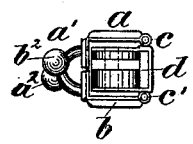
Figure 3:
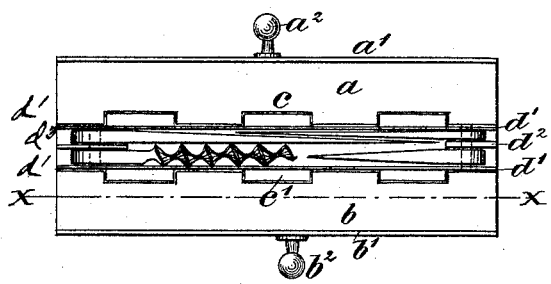
Figure 4:
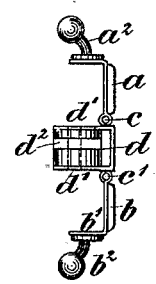
Figure 5:
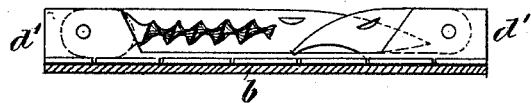
Figure 6:
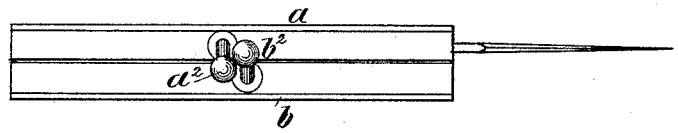

Fig. 1 is a plan, and Fig. 2 an end view, of the closed knife. Figs. 3 and 4 are corresponding views of the knife with the casing opened. Fig. 5 is a section along line $x\,x$ of Fig. 3, and Fig. 6 shows the knife ready for use.

The casing consists of the parts $a\,b\,d$, the two external parts $a\,b$ being connected with the central part $d$ by hinge-joints $c\,c'$. The central part $d$ forms, with the several partitions $d'\,d'$ and intermediate plates $d^2\,d^3$, a solid piece, and in this piece the blades, corkscrew, button-hook, and other instruments are fastened by means of pins.

If the knife is to be carried in the pocket—that is to say, when it is out of use—the two halves $a$ and $b$ of the casing are turned on their hinges $c$ and $c'$, so as to assume the position shown by Figs. 1 and 2, in which the blades and other instruments are completely covered by the casing $a\,b$ and its rectangularly-bent continuations $a'\,b'$. For keeping the casing closed, I employ two buttons $a^2\,b^2$ in the well-known manner, or any other suitable fastening.

For using the knife, the two halves of the casing are unfolded into the position shown by Figs. 3 and 4. The blade or other instrument to be used is turned up, (through an angle of one hundred and eighty degrees,) and the two halves $a$ and $b$ are again placed into the position shown by Figs. 1 and 3, after which the knife is ready for use, Fig. 6. The closed casing completely secures in position the blade or other instrument to be used, so that it cannot turn over either in one direction or in the other, without a spring being required for retaining the blade. Furthermore, those blades which are out of use cannot project over the casing, and thus give rise to accidents which sometimes occur in ordinary pocket-knives.

Having now particularly described and ascertained the nature of my invention, and in what manner the same is to be performed, what I desire to claim, and to secure by Letters Patent of the United States, is—

In a springless pocket-knife, the combination of the parts $a\,b$, the central part $d$, the partitions $d'\,d'$, and intermediate plates $d^2\,d^3$, which said parts $a\,b\,d$ are combined by hinge-joints $c\,c'$, and form with the continuations $a'\,b'$ a casing in which the blades, corkscrew, button-hook, and other instruments are fastened, and which casing is closed by buttons $a^2\,b^2$, attached to the continuations, substantially as and for the purpose herein described.

In testimony whereof I have signed this specification in the presence of two subscribing witnesses.

WILHELM VOGEL.

Witnesses:
　MAX STEINBERG,
　G. ADOLF HARDT.